US012617936B2

(12) United States Patent
Saba et al.

(10) Patent No.: US 12,617,936 B2
(45) Date of Patent: May 5, 2026

(54) LASER PRINTABLE POLYMERIC COMPOSITIONS

(71) Applicant: Dow Global Technologies LLC, Midland, MI (US)

(72) Inventors: Stacey A. Saba, Eagleville, PA (US); Paul J. Brigandi, Schwenksville, PA (US); Mohamed Esseghir, Lawrenceville, NJ (US); Bharat I. Chaudhary, Princeton, NJ (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 652 days.

(21) Appl. No.: 17/921,754

(22) PCT Filed: Jul. 26, 2021

(86) PCT No.: PCT/US2021/043183
§ 371 (c)(1),
(2) Date: Oct. 27, 2022

(87) PCT Pub. No.: WO2022/026388
PCT Pub. Date: Feb. 3, 2022

(65) Prior Publication Data
US 2023/0159730 A1      May 25, 2023

Related U.S. Application Data

(60) Provisional application No. 63/058,671, filed on Jul. 30, 2020.

(51) Int. Cl.
| | |
|---|---|
| *C08L 23/06* | (2006.01) |
| *C08K 3/04* | (2006.01) |
| *H01B 3/30* | (2006.01) |

(52) U.S. Cl.
CPC .............. *C08L 23/06* (2013.01); *C08K 3/04* (2013.01); *H01B 3/307* (2013.01); *C08L 2203/206* (2013.01)

(58) Field of Classification Search
CPC .......... C08L 23/06; C08L 27/20; C08K 3/04; C08K 5/3437; C08K 5/34926
See application file for complete search history.

(56) References Cited

U.S. PATENT DOCUMENTS

| | | | |
|---|---|---|---|
| 6,015,849 | A | 1/2000 | Gugumus |
| 6,127,475 | A | 10/2000 | Vollenberg et al. |
| 9,725,578 | B2 | 8/2017 | Maestri et al. |
| 2009/0182077 | A1 | 7/2009 | Maestri |
| 2009/0270535 | A1 | 10/2009 | Berte et al. |
| 2011/0224336 | A1 | 9/2011 | Seccomandi et al. |
| 2019/0002631 | A1 | 1/2019 | Berte' et al. |

FOREIGN PATENT DOCUMENTS

| | | |
|---|---|---|
| EP | 0710570 A1 | 5/1996 |
| JP | 2001315258 | 11/2001 |
| JP | 2006290961 | 10/2006 |
| WO | 2012153260 A1 | 11/2012 |
| WO | 2019068815 A1 | 4/2019 |
| WO | 2019210163 | 10/2019 |
| WO | 2019243134 A1 | 12/2019 |
| WO | 2022026388 | 2/2022 |

OTHER PUBLICATIONS

BASF Technical Datasheet of Tinuvin 783 FDL (Year: 2010).*
Technical Datasheet Tinuvin-622-SF (Year: 2024).*
Technical datasheet Chimassorb 944 (Year: 1975).*
Technical datasheet SABO STAB UV 119 (Year: 2012).*
International Preliminary Report on Patentability from corresponding International Application No. PCT/US2021/043183 dated Jan. 31, 2023.
Office Action from corresponding Chinese Application No. 202180060312.X dated Jun. 21, 2024.
Office Action from corresponding Chinese Application No. 202180060312.X dated Nov. 1, 2024.
Office Action from corresponding Japanese patent Application No. 2023-504831 dated May 14, 2025.

* cited by examiner

*Primary Examiner* — Catherine S Branch
*Assistant Examiner* — Olga Lucia Donahue
(74) *Attorney, Agent, or Firm* — Mark A. Twilley

(57) ABSTRACT

A polymeric composition includes an ethylene polymer, 0.05 wt % to 0.25 wt % carbon black based on a total weight of the polymeric composition and a polymeric ultraviolet light stabilizer including a hindered amine moiety and having a weight average molecular weight from 5,000 g/mol to 20,000 g/mol as measured according to Gel Permeation Chromatography.

9 Claims, No Drawings

LASER PRINTABLE POLYMERIC COMPOSITIONS

BACKGROUND

Field of the Disclosure

The present disclosure relates to compositions, and more specifically, to polymeric compositions that are laser printable.

Introduction

Laser beam printing is a method used in the marking of polymeric compositions. Laser beam printing is useful because no printing ink or physical contact between the polymeric composition and the printer are required. Further, the process of laser beam printing is fast and simple and can provide a marking of good durability.

Not every polymeric composition can be laser printed. For example, polymeric compositions often require specific additives and compositions in order to be rendered laser printable. The requirements to render a polymeric composition laser printable may be in conflict with the design of the polymeric composition based on its end use. For example, conventional wire and cable jacketing may include carbon black in concentrations from about 2 weight percent to 3 weight percent to ensure 50% retention of elongation at break after 2000 hours of accelerated ultraviolet exposure. Unfortunately, conventional carbon black concentrations of about 2 weight percent to 3 weight percent lead to insufficient contrast (i.e., 25% contrast or less) when laser printing.

Others have attempted to solve the afore mentioned issue by replacing carbon black with ultraviolet ("UV") light stabilizers. For example, European Patent Office Patent Publication Number EP0710570A1 ("'570 publication") discloses a grouping of UV light stabilizers that allow for low carbon black concentrations and provide a laser printable jacketing. The disclosed UV light stabilizers of the '570 publication are (a) a dimethyl succinate polymer with 4-hydroxy-2,2,6,6-tetramethyl-1-piperidine ethanol, (b) 2-(2'-hydroxy-5'-t-butylphenyl)-3-chlorobenzotriazole, (c) 2-hydroxy-4-m-octoxybenzophenone, (d) N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine, (e) 2-(3',5'-di-tert-butyl-2'-hydroxyphenyl)-5-chlorobenzotriazole, (f) bis(2,2,6,6-tetramethyl-4-piperidinyl) sebacate, and (g) 2H-1-benzopyran-2-one, 7-(2H-naphtho[1,2D]triazol-2-yl)-3-phenyl. The disclosed UV light stabilizers of the '770 publication are either small molecules or oligomeric in nature. For example, UV light stabilizers (b), (c), (e), (f) and (g) are all small molecules whereas (a) has a number average molecular weight (Mn) from 3100 to 4000 and (d) has an Mn of 2000 to 3100 rendering (a) and (d) oligomeric. As demonstrated in Table 5 of the '570 publication, example 17A utilizing oligomeric UV light stabilizer (a) is able to produce a polymeric composition that can withstand accelerated UV light exposure with less than 2 weight percent but greater than 0.3 weight percent carbon black. However, Table 3 of the '570 publication demonstrates oligomeric UV light stabilizer (a) fails to reach a grey contrast above 25% at carbon black levels of 0.3 weight percent or greater. These results suggest that the use of polymeric ultraviolet light stabilizers comprising a hindered amine moieties require a compromise between compositions that withstand accelerated UV light exposure and laser printable compositions.

Another attempt in the art to solve the issues related to laser printing wire and cable jacketing is provided by World Intellectual Property Organization Publication Number WO2019068815A1 ("'815 publication") and utilizes carbon black and a synergistic blend of oligomeric hindered amine UV light stabilizers. The '815 publication discloses the use of a synergistic mixture of UV light stabilizers (a) and (d) of the '570 publication in a polymeric composition, but requires at least a 0.25 weight percent carbon black concentration to retain the mechanical properties of the polymeric composition after accelerated UV exposure.

In view of the combined art's inability to achieve a polymeric composition utilizing less than 0.25 weight percent carbon black through the addition of an oligomeric hindered amine light stabilizer, it would be surprising to discover a polymeric composition that comprises 0.05 wt % to 0.25 wt % of carbon black and a polymeric ultraviolet light stabilizer having a weight average molecular weight from 5,000 g/mol to 20,000 g/mol as measured according to Gel Permeation Chromatography that is laser printable (i.e., grey contrast of greater than 25%) and retains 50% or more of its elongation at break after 2000 hours of accelerated ultraviolet exposure.

SUMMARY OF THE DISCLOSURE

The inventors of the present application have surprisingly discovered that the use of a polymeric ultraviolet light stabilizer comprising a hindered amine moiety and having a weight average molecular weight from 5,000 g/mol to 20,000 g/mol as measured according to Gel Permeation Chromatography enables the formation of a polymeric composition having 0.05 weight percent to 0.25 weight percent carbon black that is laser printable (i.e., grey contrast of greater than 25%) and retains 50% or more of its elongation at break after 2000 hours of accelerated UV light exposure. Without being bound by theory, it is believed that the higher molecular weight of the polymeric UV light stabilizer, as opposed to the oligomeric UV light stabilizers of the prior art, resists migration and segregation during manufacturing and use of the polymeric composition. The reduced migration of the polymeric UV light stabilizer provides enhanced preservation to the stabilizer during extended exposure to UV light. As a result of the enhanced preservation and maintained dispersion of the stabilizer, the polymeric composition is able to retain 50% or more of its elongation at break after 2000 hours of accelerated UV light exposure. The successful use of a polymeric UV light stabilizer is surprising given that it would be expected that equal weight percent of oligomeric stabilizer would be successful, but are not as demonstrated by the prior art. As the UV light stabilizer remains dispersed and allows the polymeric composition to retain its elongation at break, a lower loading of carbon black can be used that renders the polymeric composition laser printable.

The polymeric composition is particularly useful as a jacketing for wires and cables.

According to a first feature of the present disclosure, a polymeric composition comprises an ethylene polymer, 0.05 wt % to 0.25 wt % carbon black based on a total weight of the polymeric composition, and a polymeric ultraviolet light stabilizer comprising a hindered amine moiety and having a weight average molecular weight from 5,000 g/mol to 20,000 g/mol as measured according to Gel Permeation Chromatography.

According to a second feature of the present disclosure the polymeric composition comprises 95 wt % or greater of the ethylene polymer based on a total weight of the polymeric composition.

According to a third feature of the present disclosure the ethylene polymer has a density of from 0.919 g/cc to 0.950 g/cc as measured by ASTM D792.

According to a fourth feature of the present disclosure the polymeric composition further comprises an oligomer ultraviolet light stabilizer having a weight average molecular weight of from 1,000 g/mol to 5,000 g/mol as measured according to Gel Permeation Chromatography.

According to a fifth feature of the present disclosure the polymeric composition comprises from 0.25 wt % to 1.0 wt % of the oligomer ultraviolet light stabilizer based on a total weight of the polymeric composition.

According to a sixth feature of the present disclosure the oligomer ultraviolet light stabilizer has a chemical abstract services registration number of 136504-96-6 or 71878-19-8.

According to a seventh feature of the present disclosure the polymeric composition comprises from 0.10 wt % to 0.25 wt % carbon black based on a total weight of the polymeric composition.

According to an eighth feature of the present disclosure the polymeric composition comprises from 0.25 wt % to 2 wt % of the polymeric ultraviolet light stabilizer based on a total weight of the polymeric composition.

According to a ninth feature of the present disclosure the polymeric ultraviolet light stabilizer has a weight average molecular weight from 8,000 g/mol to 12,000 g/mol as measured according to Gel Permeation Chromatography, further wherein the polymeric ultraviolet light stabilizer has a chemical abstract services registration number of 136504-96-6.

According to a tenth feature of the present disclosure a coated conductor comprises a conductor and the polymeric composition disposed at least partially around the conductor.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All ranges include endpoints unless otherwise stated.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards. When used herein, Chemical Abstract Services registration numbers refer to the most recent chemical or chemical composition designated for that registration number as of the priority date of this document.

As used herein, the term weight percent ("wt %") designates the percentage by weight a component is of a total weight of the polymeric composition unless otherwise indicated. The term mole percent ("mol %") designates the percentage by moles a component is of a total moles of the item in which the component is present.

Unless otherwise provided herein, density is measured in accordance with ASTM D792, Method B. The result is recorded in grams (g) per cubic centimeter (g/cc).

Unless otherwise provided herein, a melt index (MI) is measured in accordance with ASTM D1238, Condition 190° C./2.16 kilogram (kg) weight and is reported in grams eluted per 10 minutes (g/10 min).

"Polymer" means a polymeric compound prepared by polymerizing monomers, whether of the same or a different type. The generic term polymer thus embraces the terms homopolymer, interpolymer and copolymer.

Polymeric Compositions

The present disclosure provides a polymeric composition. The polymeric composition comprises an ethylene polymer, carbon black and a polymeric ultraviolet light stabilizer ("polymeric stabilizer"). The polymeric composition may also comprise an oligomer ultraviolet light stabilizer ("oligomeric stabilizer"). As will be explained in greater detail below, the polymeric composition may be utilized to form a jacket of a coated conductor.

Ethylene Polymer

The polymeric composition comprises the ethylene polymer. The ethylene polymer may comprise 50 mol % or greater, 60 mol % or greater, 70 mol % or greater, 80 mol % or greater, 85 mol % or greater, 90 mol % or greater, or 91 mol % or greater, or 92 mol % or greater, or 93 mol % or greater, or 94 mol % or greater, or 95 mol % or greater, or 96 mol % or greater, or 97 mol % or greater, or 97.5 mol % or greater, or 98 mol % or greater, or 99 mol % or greater, while at the same time, 100 mol % or less, 99.5 mol % or less, or 99 mol % or less, or 98 mol % or less, or 97 mol % or less, or 96 mol % or less, or 95 mol % or less, or 94 mol % or less, or 93 mol % or less, or 92 mol % or less, or 91 mol % or less, or 90 mol % or less, or 85 mol % or less, or 80 mol % or less, or 70 mol % or less, or 60 mol % or less of ethylene as measured using Nuclear Magnetic Resonance (NMR) or Fourier-Transform Infrared (FTIR) Spectroscopy. Other units of the ethylene polymer may include $C_3$ to $C_4$, or $C_6$, or $C_8$, or $C_{10}$, or $C_{12}$, or $C_{16}$, or $C_{18}$, or $C_{20}$ α-olefins, such as propylene, 1-butene, 1-hexene, 4-methyl-1-pentene, and 1-octene. Other units of the ethylene polymer may be derived from one or more polymerizable monomers including, but not limited to, polar monomers such as unsaturated esters. The unsaturated esters may be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates include, but are not limited to, vinyl acetate, vinyl propionate, and vinyl butanoate. The ethylene polymer may have a polar monomer content of 40 wt % or less, or 35 wt % or less, or 30 wt % or less, or 25 wt % or less, or 20 wt % or less, 15 wt %, or 10 wt %, or 5 wt % or less, or 3 wt % or less, or 1 wt % or less, or 0 wt % based on the total weight of the ethylene polymer as measured using Nuclear Magnetic Resonance (NMR) or Fourier-Transform Infrared (FTIR) Spectroscopy.

The density of the ethylene polymer may be 0.900 g/cc or greater, or 0.904 g/cc or greater, or 0.910 g/cc or greater, or 0.915 g/cc or greater, or 0.919 g/cc or greater, or 0.920 g/cc or greater, or 0.921 g/cc or greater, or 0.922 g/cc or greater, or 0.925 g/cc or greater, or 0.926 g/cc or greater, or 0.930 g/cc or greater, or 0.935 g/cc or greater, 0.940 g/cc or greater, 0.945 g/cc or greater, while at the same time, 0.950 g/cc or less, or 0.940 g/cc or less, or 0.935 g/cc or less, or 0.930 g/cc or less, or 0.925 g/cc or less, or 0.920 g/cc or less, or 0.919 g/cc or less, or 0.915 g/cc or less, or 0.910 g/cc or less, or 0.905 g/cc or less as measured according to ASTM D792.

The melt index of the ethylene polymer may be 0.1 g/10 min or greater, or 0.3 g/10 min or greater, or 0.5 g/10 min or greater, or 1.0 g/10 min or greater, or 1.5 g/10 min or greater, or 2.0 g/10 min or greater, or 2.5 g/10 min or greater, or 3.0 g/10 min or greater, or 3.5 g/10 min or greater, or 4.0 g/10 min or greater, or 4.5 g/10 min or greater, or 10.0 g/10 min or greater, or 18 g/10 min or greater, while at the same time, 30.0 g/10 min or less, or 25.0 g/10 min or less, or 20.0 g/10 min or less, or 18.0 g/10 min or less, or 15.0 g/10 min or less, or 10.0 g/10 min or less, or 5.0 g/10 min or less, or 4.5 g/10 min or less, or 4.0 g/10 min or less, or 3.5 g/10 min or less, or 3.0 g/10 min or less, or 2.5 g/10 min or less, or 2.0 g/10 min or less, or 1.5 g/10 min or less, or 1.0 g/10 min or less, or 0.5 g/10 min or less as measured according to ASTM D1238.

The polymeric composition comprises from 80 wt % to 99 wt % of the ethylene polymer. For example, the polymeric composition may comprise 80 wt % or greater, or 82 wt % or greater, or 84 wt % or greater, or 86 wt % or greater, or 88 wt % or greater, or 90 wt % or greater, or 92 wt % or greater, or 94 wt % or greater, or 95 wt % or greater, or 96 wt % or greater, or 98 wt % or greater, while at the same time, 99 wt % or less, or 98 wt % or less, or 96 wt % or less, or 95 wt % or less, or 94 wt % or less, or 92 wt % or less, or 90 wt % or less, or 88 wt % or less, or 86 wt % or less, or 84 wt % or less, or 82 wt % or less of the ethylene polymer based on the total weight of the polymeric composition.

Carbon Black

The polymeric composition comprises carbon black. Carbon black has a Chemical Abstract Services ("CAS") registration number of 1333-86-4. The polymeric composition may comprise the carbon black in an amount from 0.05 wt % to 0.25 wt % based on a total weight of the polymeric composition. For example, the polymeric composition may comprise 0.05 wt % or greater, or 0.06 wt % or greater, or 0.07 wt % or greater, or 0.08 wt % or greater, or 0.09 wt % or greater, or 0.10 wt % or greater, or 0.11 wt % or greater, or 0.12 wt % or greater, or 0.13 wt % or greater, or 0.14 wt % or greater, or 0.15 wt % or greater, or 0.16 wt % or greater, or 0.17 wt % or greater, or 0.18 wt % or greater, or 0.19 wt % or greater, or 0.20 wt % or greater, or 0.21 wt % or greater, or 0.22 wt % or greater, or 0.23 wt % or greater, or 0.24 wt % or greater, while at the same time, 0.25 wt % or less, or 0.24 wt % or less, or 0.23 wt % or less, or 0.22 wt % or less, or 0.21 wt % or less, or 0.20 wt % or less, or 0.19 wt % or less, or 0.18 wt % or less, or 0.17 wt % or less, or 0.16 wt % or less, or 0.15 wt % or less, or 0.14 wt % or less, or 0.13 wt % or less, or 0.12 wt % or less, or 0.11 wt % or less, or 0.10 wt % or less, or 0.09 wt % or less, or 0.08 wt % or less, or 0.07 wt % or less, or 0.06 wt % or less of the carbon black based on a total weight of the polymeric composition.

The carbon black may have an average particle size of between about 10 nm to about 300 nm, or from 10 nm to 100 nm, or from 15 nm to 50 nm as measured using laser diffraction spectroscopy. The carbon black may be added to the polymeric composition as a neat, or pure component, or may be added as part of a masterbatch combined with one or more other components (e.g., resins, antioxidants and/or processing aids).

Polymeric Ultraviolet Light Stabilizer

The polymeric composition comprises the polymeric ultraviolet light stabilizer. The polymeric stabilizer comprises one or more hindered amine moieties. As used herein, a hindered amine moiety is an amine moiety present on an aromatic ring such that the lone pair of electrons of the nitrogen atom is conjugated into the aromatic ring. An example of a polymeric stabilizer comprising a hindered amine moiety has a Chemical Abstract Services ("CAS") registration number of 136504-96-6 and is described as 1,3-propanediamine, N1,N1'-1,2-ethanediylbis-, polymer with 2,4,6-trichloro-1,3,5-triazine, reaction products with N-butyl-2,2,6,6-tetramethyl-4-piperidinamine. A commercial example of the polymeric stabilizer is sold under the tradename UVASORB™ HA10 from 3V Sigma USA, Georgetown, South Carolina, USA. The polymeric stabilizer has a weight average molecular weight of from 5,000 grams per mol ("g/mol") to 20,000 g/mol as measured according to Gel Permeation Chromatography. For example, the polymeric stabilizer may have a weight average molecular weight of 5,000 g/mol or greater, or 6,000 g/mol or greater, or 7,000 g/mol or greater, or 8,000 g/mol or greater, or 9,000 g/mol or greater, or 10,000 g/mol or greater, or 11,000 g/mol or greater, or 12,000 g/mol or greater, or 13,000 g/mol or greater, or 14,000 g/mol or greater, or 15,000 g/mol or greater, or 16,000 g/mol or greater, or 17,000 g/mol or greater, or 18,000 g/mol or greater, or 19,000 g/mol or greater, while at the same time, 20,000 g/mol or less, or 19,000 g/mol or less, or 18,000 g/mol or less, or 17,000 g/mol or less, or 16,000 g/mol or less, or 15,000 g/mol or less, or 14,000 g/mol or less, or 13,000 g/mol or less, or 12,000 g/mol or less, or 11,000 g/mol or less, or 10,000 g/mol or less, or 9,000 g/mol or less, or 8,000 g/mol or less, or 7,000 g/mol or less, or 6,000 g/mol or less as measured according to Gel Permeation Chromatography.

The polymeric composition may comprise the polymeric stabilizer in an amount from 0.25 wt % to 2.00 wt % based on a total weight of the polymeric composition. For example, the polymeric composition may comprise 0.25 wt % or greater, or 0.50 wt % or greater, or 0. 75 wt % or greater, or 1.00 wt % or greater, or 1.25 wt % or greater, or 1.50 wt % or greater, or 1.75 wt % or greater, while at the same time, 2.00 wt % or less, or 1.75 wt % or less, or 1.50 wt % or less, or 1.25 wt % or less, or 1.00 wt % or less, or 0.75 wt % or less, or 0.50 wt % or less of the polymeric stabilizer based on the total weight of the polymeric composition.

Oligomeric Ultraviolet Light Stabilizer

The polymeric composition may comprise the oligomeric ultraviolet light stabilizer. The oligomeric stabilizer may comprise one or more hindered amine moieties. An example of the oligomeric stabilizer has a CAS registration number of 136504-96-6 and is described as 1,3-propanediamine, N1,N1'-1,2-ethanediylbis-, polymer with 2,4,6-trichloro-1, 3,5-triazine, reaction products with N-butyl-2,2,6,6-tetramethyl-4-piperidinamine. Such an oligomeric stabilizer is sold under the tradename UVASORB™ HA88 from 3V Sigma USA, Georgetown, South Carolina, USA. Another example of the oligomeric stabilizer has a CAS registration number 71878-19-8 and is described as poly[[6-[(1,1,3,3-tetramethylbutyl)amino]-1,3,5-triazine-2,4-diyl][(2,2,6,6-tetramethyl-4-piperidinyl)imino]-1,6 hexanediyl[(2,2,6,6-tetramethyl-4-piperidinyl)imino]]. Such an oligomeric stabilizer is sold under the tradename CHIMASSORB™ 944 LD from BASF, Ludwigshafen, Germany.

The oligomeric stabilizer has a weight average molecular weight of from 1,000 g/mol to 5,000 g/mol as measured according to Gel Permeation Chromatography. For example, the polymeric stabilizer may have a weight average molecular weight of 1,000 g/mol or greater, or 1,500 g/mol or greater, or 2,000 g/mol or greater, or 2,500 g/mol or greater, or 3,000 g/mol or greater, or 3,500 g/mol or greater, or 4,000 g/mol or greater, or 4,500 g/mol or greater, while at the same time, 5,000 g/mol or less, or 4,500 g/mol or less, or 4,000 g/mol or less, or 3,500 g/mol or less, or 3,000 g/mol or less, or 2,500 g/mol or less, or 2,000 g/mol or less, or 1,500 g/mol or less as measured according to Gel Permeation Chromatography.

The polymeric composition may comprise the oligomeric stabilizer in an amount from 0.25 wt % to 2.00 wt % based on a total weight of the polymeric composition. For example, the polymeric composition may comprise 0.25 wt % or greater, or 0.50 wt % or greater, or 0.75 wt % or greater, or 1.00 wt % or greater, or 1.25 wt % or greater, or 1.50 wt % or greater, or 1.75 wt % or greater, while at the same time, 2.00 wt % or less, or 1.75 wt % or less, or 1.50 wt % or less, or 1.25 wt % or less, or 1.00 wt % or less, or 0.75 wt % or less, or 0.50 wt % or less of the oligomeric stabilizer based on the total weight of the polymeric composition.

Additives

The polymeric composition may include one or more additives. Nonlimiting examples of suitable additives include antioxidants, colorants, corrosion inhibitors, lubricants, ultraviolet (UV) absorbers or stabilizers, anti-blocking agents, flame-retardants, coupling agents, compatibilizers, plasticizers, fillers, processing aids, and combinations thereof. The one or more additives may be combined with a polyethylene resin to form a masterbatch such that a portion or all of the additives may be introduced to the polymeric composition in one or more masterbatches.

The polymeric composition may include an antioxidant. Nonlimiting examples of suitable antioxidants include phenolic antioxidants, thio-based antioxidants, phosphate-based antioxidants, and hydrazine-based metal deactivators. Suitable phenolic antioxidants include high molecular weight hindered phenols, methyl-substituted phenol, phenols having substituents with primary or secondary carbonyls, and multifunctional phenols such as sulfur and phosphorous-containing phenol. Representative hindered phenols include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. The polymeric composition may include pentaerythritol tetrakis(3-(3,5-di-tert-butyl-4-hydroxyphenyl)propionate), commercially available as Irganox™ 1010 from BASF. A nonlimiting example of a suitable methyl-substituted phenol is isobutylidenebis(4,6-dimethylphenol). A nonlimiting example of a suitable hydrazine-based metal deactivator is oxalyl bis(benzylidiene hydrazide). The polymeric composition may contain from 0 wt %, or 0.001 wt %, or 0.01 wt %, or 0.02 wt %, or 0.05 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the polymeric composition.

The composition may include a processing aid. Nonlimiting examples of suitable processing aids include oils, organic acids (such as stearic acid), and metal salts of organic acids (such as zinc stearate). In an embodiment, the composition contains from 0 wt %, or 0.01 wt %, or 0.02 wt %, or 0.05 wt %, or 0.07 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt %, or 5.0 wt %, or 10.0 wt %, or 20.0 wt % processing aid, based on total weight of the composition.

The composition may contain from 0 wt % or greater, or 0.001 wt % or greater, or 0.002 wt % or greater, or 0.005 wt % or greater, or 0.006 wt % or greater, or 0.008 wt % or greater, or 0.009 wt % or greater, or 0.01 wt % or greater, or 0.2 wt % or greater, or 0.3 wt % or greater, or 0.4 wt % or greater, or 0.5 wt % or greater, or 1.0 wt % or greater, or 2.0 wt % or greater, or 3.0 wt % or greater, or 4.0 wt % or greater, or 5.0 wt % or greater, or 10.0 wt % or greater, or 15.0 wt % or greater, or 20.0 wt % or greater, or 30 wt % or greater, or 40 wt % or greater, or 50 wt % or greater additive, based on the total weight of the polymeric composition.

Coated Conductor

The present disclosure also provides a coated conductor. The coated conductor includes a conductor and a coating on the conductor, the coating including the polymeric composition. The polymeric composition is at least partially disposed around the conductor to produce the coated conductor. The conductor may comprise a conductive metal or an optically transparent structure.

The process for producing a coated conductor includes mixing and heating the polymeric composition to at least the melting temperature of the polymeric components in an extruder to form a polymeric melt blend, and then coating the polymeric melt blend onto the conductor. The term "onto" includes direct contact or indirect contact between the polymeric melt blend and the conductor. The polymeric melt blend is in an extrudable state.

The polymeric composition is disposed around on and/or around the conductor to form a coating. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the conductor. The coating may directly contact the conductor. The coating may directly contact an insulation layer surrounding the conductor.

EXAMPLES

Test Methods

Elongation at break: Tensile testing to determine elongation at break was conducted according to ASTM D638 at 5.08 centimeters per minute using an International Organization for Standards 527 type 5a dog bone using a INSTRU-MET™ 4201 tensile tester. Percent retention of elongation was determined by dividing the average elongation at break of a sample after UV aging by the elongation at break of an unaged sample. The elongation at break data of Table 3 is reported as the average elongation at break for five of samples with 1 standard deviation also being reported.

Grey contrast: Percent gray contrast was calculated using ImageJ software (NIH) on a marking generated at a beam wavelength of 1064.6 nm, a frequency of 60 kHz, an intensity of 90% and a marking speed of 2000 mm/s.

Molecular Weight: Unless otherwise denoted herein, molecular weight is the weight average molecular weight and is determined by Gel Permeation Chromatography. Gel permeation chromatography (GPC) was performed on a Waters modular chromatographic HPLC/SEC system. The mobile phase was tetrahydrofuran with 0.08 molar diethanolamine and was degassed with helium. Two mesopore columns from Polymer Laboratories were used. The GPC was performed at a temperature of 30° C. and a flow rate of 0.6 liters per minute. The concentration used was greater than 10 milligrams per milliliter and the injection volume was 50 microliters. The GPC measurement was carried out for a time period of 40 minutes. Calibration for the GPC was carried out using a polynomial of degree 3 based on 8 polystyrene standards with a narrow molecular weight distribution with peak molecular weight of between 382 g/mol and 95000 g/mol.

Materials

The materials used in the examples are provided below.

Resin is a UNIPOL™ gas phase unimodal medium density polyethylene with a density of 0.935 g/cc and a melt index (MI, $I_2$) of 0.6 g/10 min (190° C./2.16 kg).

CBMB is a carbon black masterbatch that is 45 wt % carbon black and is available from The Dow Chemical Company, Midland, MI, USA.

HALS is a hindered amine light stabilizer having a CAS registration number of 70624-18-9 and is commercially available under the tradename CHIMASSORB™ 944 from BASF, Ludwigshafen, Germany.

HA10 is a polymeric ultraviolet light stabilizer having a CAS registration number of 136504-96-6 and a weight average molecular weight of approximately 10,000 as measured according to Gel Permeation Chromatography. HA10 is commercially available under the tradename UVA-SORB™ HA10 from 3V Sigma USA, Georgetown, South Carolina, USA.

HA88 is an oligomeric ultraviolet light stabilizer having a CAS registration number of 136504-96-6 and a weight average molecular weight of approximately 3,000 as measured according to Gel Permeation Chromatography. HA88 is commercially available under the tradename UVA-SORB™ HA88 from 3V Sigma USA, Georgetown, South Carolina, USA.

AO is poly(1,2-dihydro-2,2,4-trimethylquinoline) having a CAS registration number of 26780-96-1 and commercially available under the tradename NAUGARD™ Super Q stabilizer from Addivant, Danbury, Connecticut, USA.

PA is a fluororesin processing aid commercially available under the tradename DYNAMAR™ FX 5912 available from 3M, Saint Paul, Minnesota, USA.

Resin 2: is a UNIPOL™ gas phase unimodal high-density polyethylene with a density of 0.945 g/cc and a melt index (MI, $I_2$) of 0.8 g/10 min (190° C./2.16 kg).

Sample Preparation

Inventive examples ("IE"), comparative examples ("CE") and test samples (S) were prepared on a BRABENDER™ mixer preheated to 180° C. and mixed at 40 revolutions per minute ("rpm") with roller blades. First, all resins were added and brought to a flux. Stabilizers and process aids were then added and fluxed for 5 minutes. The examples and test samples were then cold pressed, coarse pelletized, and extruded on a BRABENDER™ extruder. The temperature profile of the extruder was 150° C. to 180° C., 40 rpm, and a 20/40/20 screen pack. The strand was then pelletized to form pellets.

Plaques were prepared by compression molding pellets on a pre-heated Arbor press to 180° C. The pellets were placed into a 1.905 millimeter (mm) mold. The samples were heated to 180° C. for 4 minutes, then pressed for 3 minutes at a pressure 3.45 MPa followed by 3 minutes at a pressure of 17.24 MPa. Samples were cooled in the press at 15° C. per minute until reaching approximately 23° C. and then conditioned per testing requirements. Dog bone specimens were cut from the compression molded plaques.

Ultraviolet aging was performed on the dog bone samples according to Telecordia GR-20 with cycles at 70° C. at 0.7 W/(m² nm) irradiation for 20 hours followed by 4 hours of dark condensation at 55° C. Samples were pulled at 1000 hour and 2000 hour increments.

Compression molded plaques (1.27 mm×101.6 mm×101.6 mm) of the test samples were prepared and laser marked according to the parameters of Table 1.

TABLE 1

| Laser Model | YLP-1/100/20/20-HC λ1064.6 nm |
| --- | --- |
| Beam Diameter | 7.794 mm |
| Beam Delivery | SCANLab HurrySCAN 11/14 |
| Focus Lens | Linos 245 mm F-Theta-Ronar |
| Controller | Lanmark Controls Maestro 3000 (LEC-1) IPG Laser ext. board |
| Software | Lanmark Controls WinLase LAN 5 v.5.1.11.14 |
| Pulse Energy | 1 mJ |
| Marking Speed | 2000 mm/s |

Results

Table 2 provides the composition and grey contrast of the test samples. The purpose of the test samples was to demonstrate grey contrast as a function of carbon black concentration. The CBMB values of Table 2 provide the weight percent, based on the total weight of the test sample, of the CBMB and in parentheses the carbon black weight percent.

TABLE 2

| Components | S1 | S2 | S3 | S4 | S5 | S6 |
| --- | --- | --- | --- | --- | --- | --- |
| CBMB (wt %) | 0.22 (0.10) | 0.56 (0.25) | 0.84 (0.38) | 1.11 (0.50) | 2.78 (1.25) | 5.56 (2.50) |
| HALS (wt %) | 0.25 | 0.25 | 0.25 | 0.25 | 0.25 | 0.25 |
| Resin 2 (wt %) | 99.31 | 98.97 | 98.69 | 98.42 | 96.75 | 93.97 |
| AO (wt %) | 0.20 | 0.20 | 0.20 | 0.20 | 0.20 | 0.20 |
| PA (wt %) | 0.02 | 0.02 | 0.02 | 0.02 | 0.02 | 0.02 |
| Total (wt %) | 100.00 | 100.00 | 100.00 | 100.00 | 100.00 | 100.00 |
| Grey Contrast (%) | 41% | 38% | 25% | 11% | 6% | 4% |

As can be seen from Table 2, test samples 1 and 2 both have sufficiently low carbon black levels to enable a grey contrast of greater than 25%. As such, test samples 1 and 2 are laser printable. Testing samples S3-S6 exhibit grey contrasts of 25% or less meaning that the compositions with carbon black weight percent of 0.38 and greater are not laser printable.

Table 3 provides the composition of IE1-IE4 and CE1-CE3. Table 3 also provides the mechanical testing data for the initial state (i.e., no accelerated UV aging) and UV aged states after 1000 hours ("h') or 2000 hours of accelerated UV exposure.

TABLE 3

| Component | IE1 | IE2 | IE3 | IE4 | CE1 | CE2 | CE3 |
|---|---|---|---|---|---|---|---|
| CBMB | 0.33 | 0.33 | 0.33 | 0.33 | 5.67 | 0.33 | 0.33 |
|  | (0.15) | (0.15) | (0.15 | (0.15) | (2.55) | (0.15 | (0.15) |
| Resin | 98.95 | 98.45 | 98.45 | 98.45 | 94.11 | 99.45 | 98.95 |
| HALS |  |  |  | 0.50 |  |  | 0.50 |
| HA10 | 0.50 | 0.50 | 0.25 | 0.50 |  |  |  |
| HA88 |  | 0.50 | 0.75 |  |  |  |  |
| AO | 0.20 | 0.20 | 0.20 | 0.20 | 0.20 | 0.20 | 0.20 |
| PA | 0.02 | 0.02 | 0.02 | 0.02 | 0.02 | 0.02 | 0.02 |
| Total | 100 | 100 | 100 | 100 | 100 | 100 | 100 |
| Property | | | | | | | |
| Elongation (%), unaged | 860 ± 29 | 882 ± 64 | 891 ± 43 | 912 ± 44 | 956 ± 33 | 887 ± 32 | 859 ± 33 |
| Elongation (%), 1000 h | 752 ± 43 | 765 ± 62 | 745 ± 84 | 783 ± 25 | 766 ± 14 | 54 ± 8 | 727 ± 99 |
| % Retention, 1000 h | 87 | 87 | 84 | 86 | 80 | 6 | 85 |
| Elongation (%), 2000 h | 595 ± 111 | 673 ± 75 | 603 ± 46 | 519 ± 181 | 642 ± 33 | 38 ± 6 | 153 ± 126 |
| % Retention, 2000 h | 62 | 76 | 67 | 57 | 67 | 4 | 18 |

As can be seen from Table 3, IE1-IE4 all have carbon black concentrations sufficiently low enough to enable laser printing and as such it is believed that IE1-IE4 are laser printable. Further, IE1-IE4 all retain 50% or more elongation at break after 2000 hours of accelerated ultraviolet exposure. IE1 demonstrates that the use of the polymeric stabilizer, without additional oligomeric stabilizers, may allow for the formation of a laser printable composition that retains 50% or more of its elongation at break after 2000 hours of accelerated ultraviolet exposure. IE2-IE4 each demonstrate that oligomeric stabilizers of the same or different type as the polymeric stabilizer may be utilized in addition to the polymeric stabilizer and still enable a laser printable composition that retains 50% or more of its elongation at break after 2000 hours of accelerated ultraviolet exposure. CE1, with 2.55 wt % carbon black, unsurprisingly retains 50% or more of its elongation at break after 2000 hours of accelerated ultraviolet exposure but is not laser printable based on the understanding provided by Table 2. CE2 and CE3 demonstrate that without the polymeric stabilizer the compositions may be laser printable due to low carbon black levels but cannot retain 50% or more of its elongation at break after 2000 hours of accelerated ultraviolet exposure.

What is claimed is:

1. A polymeric composition comprising:
95 wt % or greater of an ethylene polymer based on a total weight of the polymeric composition;
0.1 wt % to 0.19 wt % carbon black based on a total weight of the polymeric composition; and
0.25 wt % to 2 wt % of a polymeric ultraviolet light stabilizer based on a total weight of the polymeric composition, the polymeric ultraviolet light stabilizer comprising a hindered amine moiety and having a weight average molecular weight from 8,000 g/mol to 12,000 g/mol as measured according to Gel Permeation Chromatography.

2. The polymeric composition of claim 1, wherein the ethylene polymer has a density of from 0.919 g/cc to 0.950 g/cc as measured by ASTM D792.

3. The polymeric composition of claim 1, wherein the polymeric composition further comprises:
an oligomer ultraviolet light stabilizer having a weight average molecular weight of from 1,000 g/mol to 5,000 g/mol as measured according to Gel Permeation Chromatography.

4. The polymeric composition of claim 3, wherein the polymeric composition comprises from 0.25 wt % to 1.0 wt % of the oligomer ultraviolet light stabilizer based on a total weight of the polymeric composition.

5. The polymeric composition of claim 4, wherein the oligomer ultraviolet light stabilizer has a chemical abstract services registration number of 136504-96-6 or 71878-19-8.

6. The polymeric composition of claim 1, wherein the polymeric ultraviolet light stabilizer has a chemical abstract services registration number of 136504-96-6.

7. The polymeric composition of claim 1, wherein the ethylene polymer is unimodal.

8. The polymeric composition of claim 7, wherein the ethylene polymer is free of silane-functionalization.

9. A coated conductor comprising:
a conductor; and
the polymeric composition of claim 1 disposed at least partially around the conductor.

* * * * *